United States Patent [19]

Kato et al.

[11] Patent Number: 4,672,904
[45] Date of Patent: Jun. 16, 1987

[54] DEVICE FOR ATTACHING A MEMORY CASSETTE OF A COMPUTERIZED SEWING MACHINE

[75] Inventors: Kenji Kato; Shoji Kato, both of Tokyo, Japan

[73] Assignee: Janome Sewing Machine Co., Ltd., Tokyo, Japan

[21] Appl. No.: 774,402

[22] Filed: Sep. 6, 1985

[30] Foreign Application Priority Data

Sep. 17, 1984 [JP] Japan .......................... 59-139440[U]
Sep. 17, 1984 [JP] Japan .......................... 59-139441[U]

[51] Int. Cl.⁴ ............................................. D05B 3/02
[52] U.S. Cl. ................... 112/457; 112/121.11
[58] Field of Search .......... 112/457, 458, 453, 121.12, 112/121.11, 454, 455, 456; 364/470

[56] References Cited

U.S. PATENT DOCUMENTS

| | | | |
|---|---|---|---|
| 4,203,378 | 5/1980 | Giesselmann et al. | 112/457 |
| 4,280,420 | 7/1981 | Nishida et al. | 112/121.12 X |
| 4,301,753 | 11/1981 | Meier | 112/453 X |
| 4,406,235 | 9/1983 | Eguchi | 112/458 X |
| 4,548,142 | 10/1985 | Peck | 112/121.12 |

*Primary Examiner*—Peter Nerbun
*Attorney, Agent, or Firm*—Michael J. Striker

[57] ABSTRACT

When a cassette is attached to or detached from a memory sewing machine, a switch provided on the sewing machine is actuated in association with the attaching or detaching so as to stop the operation of the circuit of the computer. During the actuation of said switch, an opening or closing is made between the connecting pin of the memory cassette and the circuit of the computer, and in the position where the attaching or detaching of the cassette is completed, the switch is returned to its initial position so as to position the circuit of the computer at the initial resetting condition so that a new stitching control is started.

6 Claims, 11 Drawing Figures

FIG_1
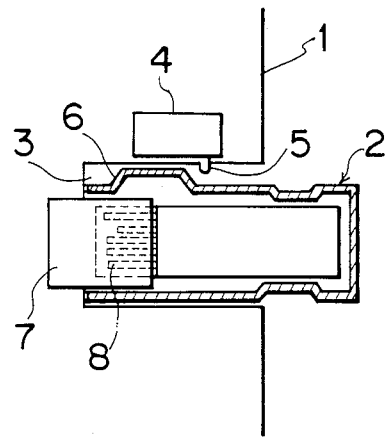
FIG_2
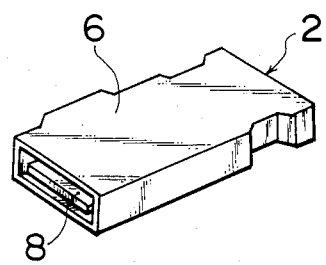
FIG_3
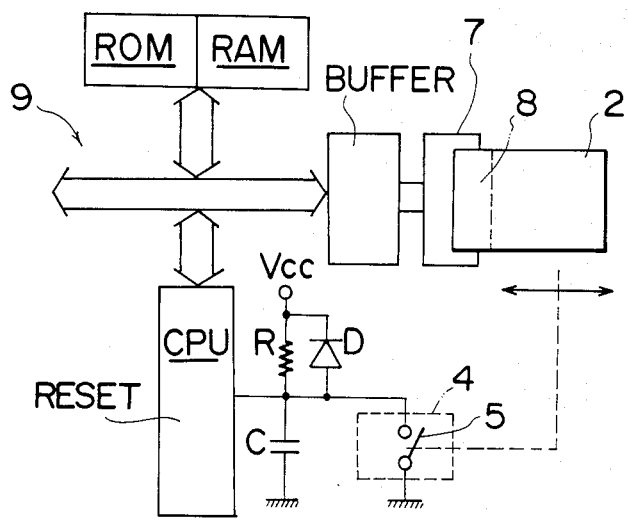
FIG_4
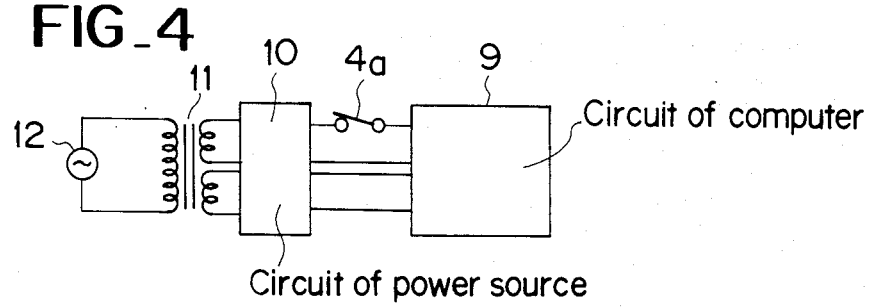

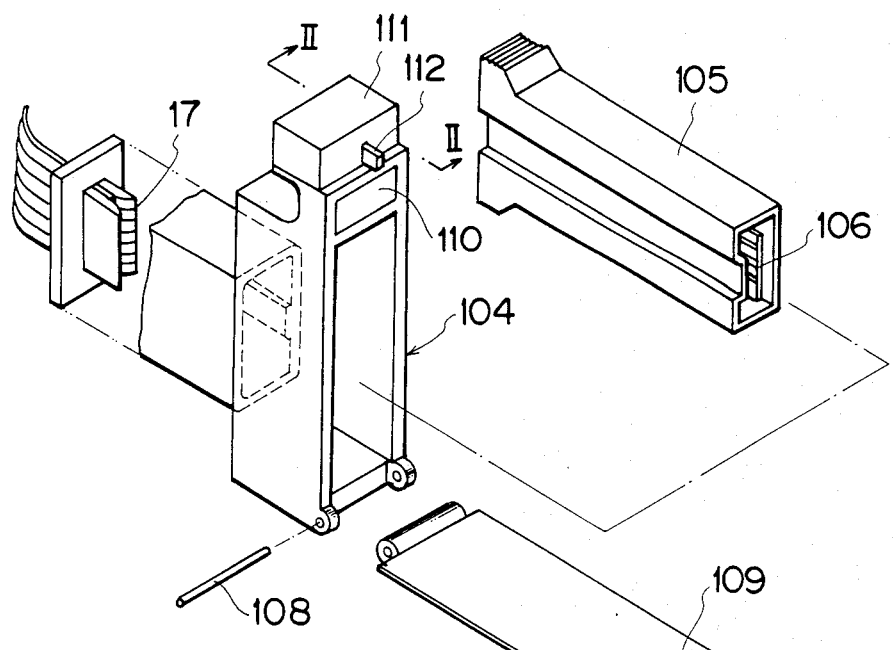
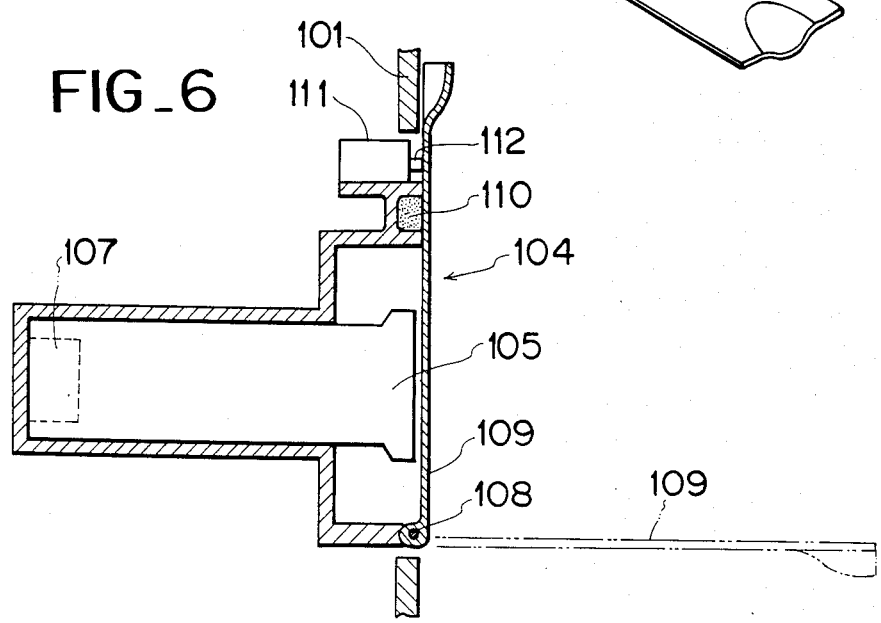

FIG_7
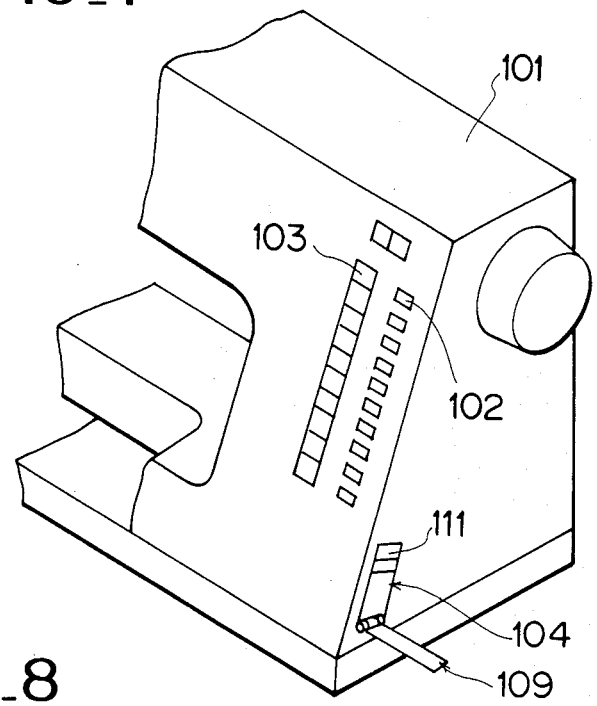
FIG_8
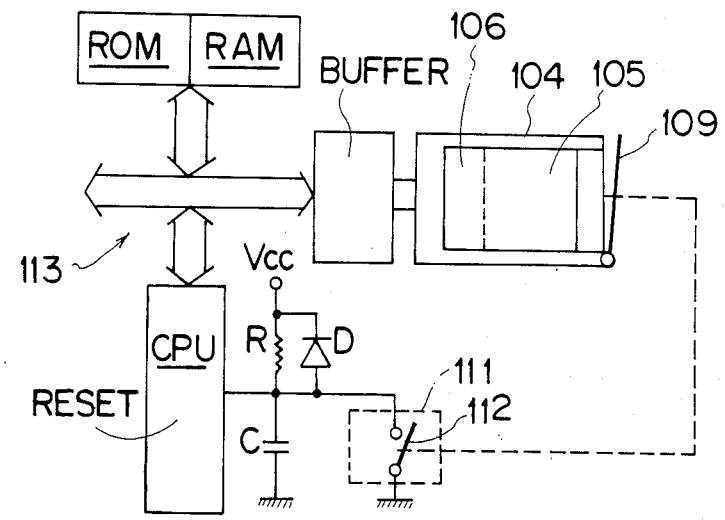

FIG_9
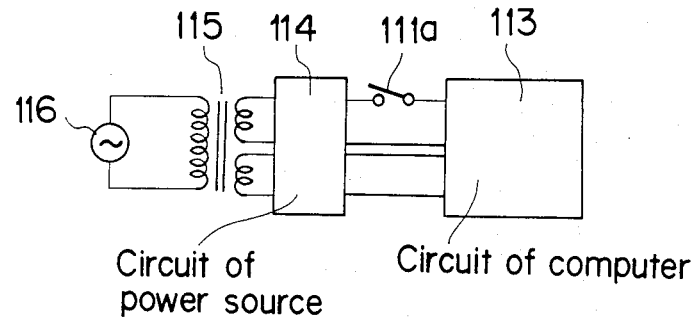
FIG_10
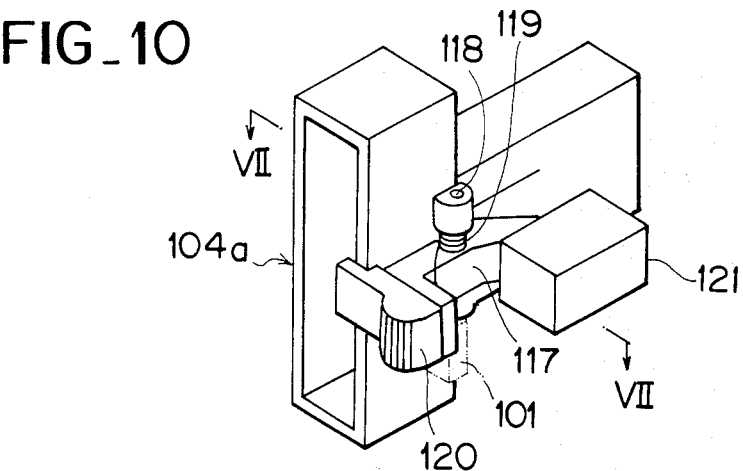
FIG_11
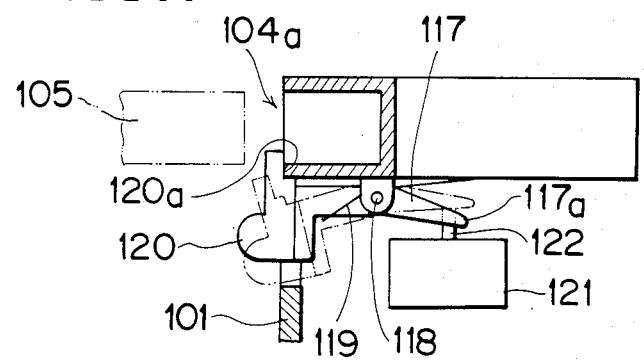

DEVICE FOR ATTACHING A MEMORY CASSETTE OF A COMPUTERIZED SEWING MACHINE

BACKGROUND OF THE INVENTION

Field of the Invention

This invention relates to a device for attaching a memory instrumentally for stitch control signal to a computerized sewing machine.

In some of the computerized sewing machines, the memory instrumentalities are produced in a cassette type. That is to say, for patterns of high frequency in use, electronic memory instrumentalities are housed within the sewing machine, while for patterns of low frequency in use, electronic memory instrumentalities are prepared in the cassette type for attaching to the sewing machine.

Unfortunately, in such sewing machines, orders of making and breaking of connecting pins between the cassette and a circuit of a computer are restrained when the cassette type memory instrumentalities are attached to and detached from the machine body because an earthing line is at first connected and broken at last, and on the other hand a control line of a power source is at last connected and at first broken.

If these lines are connected at the same time, and broken at the same time, there arises no problem. However, it is difficult to make such a structure.

Removal of the cassette type memory instrumentalities during the rotation of the sewing machine often causes reckless driving in the computer. With respect to the above mentioned restraining, the length of the connecting pin is designed so as to provide a proper connecting order.

For the problem caused by removing the cassette during the rotation of the sewing machine, operating manuals instruct handling of the cassette after breaking the power source, but notwithstanding errors will be made, and besides the operation of the cassette is troublesome.

SUMMARY OF THE INVENTION

It is an object of the present invention to avoid shortcomings of the prior art as mentioned above.

When the cassette is attached to or detached from the sewing machine, a switch is actuated in association with said attaching or detaching so as to stop the operation of the circuit of the computer. During actuation of said switch, opening or closing is made between the connecting pin of the cassette and the circuit of the computer, and at the position where the attaching or detaching of the cassette is completed, the switch is returned so as to position the circuit of the computer at the initial resetting condition so that a new stitching control is started.

BRIEF DESCRIPTION OF THE DRAWINGS

FIG. 1 is a cross sectional view of a first element part of the cassette device showing an embodiment of the invention;

FIG. 2 is a perspective view of the cassette body;

FIG. 3 is an electric circuit of the first embodiment of the invention;

FIG. 4 is another embodiment of the electric circuit;

FIG. 5 is a perspective view of the cassette device according to another embodiment of the invention;

FIG. 6 is a cross sectional view of the cassette device taken along line II—II of FIG. 5;

FIG. 7 is a partial perspective view of a sewing machine of the another embodiment of the invention;

FIG. 8 is an electric circuit for the sewing machine FIG. 7.

FIG. 9 is a further embodiment of the electric circuit;

FIG. 10 is a perspective view of still cassette device of a further embodiment of the invention; and FIG. 11 is a cross sectional view of the cassette taken along line VII—VII of FIG. 10.

DETAILED DESCRIPTION OF THE PREFERRED EMBODIMENT

In FIGS. 1 and 2, a machine body 1 is provided with a cassette housing part 3 for holding the cassette body 2 outside of the sewing machine. A micro-switch 4 projects an actuator 5 into the cassette housing part 3.

The cassette body 2 packs an electronic memory which stores stitch control data, and has a convex 6 for actuating the micro-switch 4 over a determined distance or path of the attaching movement of the cassette body 2 into the cassette housing part 3 and returning the micro-switch 4 to a non-operation position when the attaching is finished.

A socket 7 is provided at the bottom of the cassette housing part 3, and when it receives a connector 8 at the end of the cassette body 2, the cassette body 2 is connected to a circuit of the computer of the sewing machine. When the cassette body 2 is inserted into the housing part 3, and at the distance where the micro-switch 4 is actuated, the connection between the connector 8 and the computer circuit is begun and finished. On the other hand, when the cassette body 2 is detached from the housing part, the circuit breaking is begun and finished at said distance.

FIG. 3 shows an electric circuit. A central processing unit (CPU), a read-only-memory (ROM) and a random-access-memory (RAM) form a circuit 9 of the computer of the sewing machine.

The memory (ROM) stores stitch pattern control data of high frequency in use together with program control signals.

The socket 7, when receiving the cassette body 2, connects body 2 to the computer circuit 9 via a buffer (BUFFER).

The cassette body 2 stores stitch pattern control data of low frequency in use.

The open micro-switch 4 is earthed at one end, and at the other end receives a power source (Vcc) for controlling a plus electric potential via a pull-up resistor (R) as well as is connected to a reset terminal (RESET) of CPU, and during the closing of the micro-switch 4, said other end is L level and stops the operation of CPU and makes each of bass lines floating for a period of said duration.

A condenser (C) is charged for a certain time at supplying the power source or just after the micro-switch 4 has been shifted from closing to opening, and renders the resetting terminal (RESET) L level for said duration so as to stop the operation of CPU. When said charging is finished and the reset terminal is rendered H level, CPU is set at the initial set condition and operated thereafter.

A diode (D) discharges the condenser (C) during the interruption of the power source, and is ready for a next supplying of the power source.

A further explanation will be made to operations of the above mentioned structure.

When the cassette 2 is separated from the machine body 1, the micro-switch 4 is opened as shown in FIG. 3, and therefore the reset terminal (RESET) of CPU is H level ready for operation, and stitching patterns stored in ROM of the computer circuit 9 are produced by the stitch control data.

When the cassette body 2 is set in the cassette housing part 3, and before an electric connection is made between the connector 8 and the computer circuit 9 within the socket 7, the convex 6 actuates the actuator 5 of the micro-switch 4 to close the micro-switch 4.

With respect to CPU, the reset terminal (RESET) is made L level and the bass lines are made floating so that the operation of the computer circuit 9 is stopped.

When the cassette body 2 is further pushed, the connector 8 is electrically connected to the computer circuit 9 under the condition that the micro-switch 4 is closed. If the cassette body 2 is furthermore pushed the micro-switch 4 is opened. Thus, the attaching is completed. Since the micro-switch 4 is opened, CPU is set at the initial set condition and its operation is started. By the stitch control data stored in ROM of the computer circuit and the memory packed in the cassette body 2, the stitching patterns are produced.

When the charged cassette body 2 is pulled out, the micro-switch 4 is firstly operated to stop the operation of the computer circuit 9, and the electric between the cassette body 2 and the computer circuit 9 is broken, and subsequently the micro-switch is recovered and the computer circuit 9 is set at the initial reset condition ready for an operation.

FIG. 4 shows another embodiment of the electric circuit. The actuating position between the cassette body 2 and a micro-switch 4a is the same as in FIG. 1, but the micro-switch 4a is closed reversely, and a connection with the computer circuit 9 is different. The closed micro-switch 4a has substituted for the micro-switch 4 of FIG. 3 for supplying the controlling power source (Vcc).

In FIG. 4, a circuit 10 of the power source is connected to a commercial power source 12 via a transformer 11. The micro-switch 4a is interconnected between the controlling power source (Vcc) and the computer circuit 9. When the cassette body 2 is separated from the machine body 1 or attached thereto, the reset terminal (RESET) of CPU is H level and the computer circuit 9 is operative. When the micro-switch 4 is opened, the condenser (C) discharges via the diode (D), and the reset terminal (RESET) is made L level to stop the work of the computer circuit 9.

A second embodiment of the invention will be explained with reference to FIGS. 5 to 11.

In FIG. 7, the machine body 101 is provided with pattern selecting keys 102 at its front part for carrying out selection of patterns of indicators 103 with respect to stitching patterns of high use frequency.

There is provided a cassette housing part 104 at its side for externally attaching a cassette body 105 shown in FIGS. 5 and 6.

The cassette body 105 packs an electronic memory which stores stitch control data, and is provided with a connector 106 at its end, when the connector 106 is inserted into a connector 107 provided at the bottom of the cassette housing part 104, the cassette body 105 is connected to the computer circuit of the sewing machine.

The cassette housing part 104 is, for its opening, provided with a cover plate 109 pivotally connected to the housing part via a pin 108. The plate 109 is normally closed by attraction of a magnet 110 and is manually opened for attaching and detaching the cassette body 105.

With respect to a micro-switch 111, an actuator 112 thereof is pushed in when the cover plate 109 is closed, and when it is opened, the actuator 112 is returned and the micro-switch 111 is served for its duration.

FIG. 8 shows an electric circuit. A central processing unit (CPU), a read-only-memory (ROM) and a random-access-memory (RAM) form a circuit 113 of the computer of the sewing machine.

The memory (ROM) stores stitch pattern control data of high frequency in use together with program control signals.

The cassette housing part 104, when receiving the cassette body 105, connects body 105 to the computer circuit 113 via a buffer (BUFFER).

The cassette body 105 stores stitch pattern control data of low use frequency.

The micro-switch 111 is opened when the cover plate 109 is closed, and is closed when the latter is opened. This switch 111 is earthed at one end, and at the other end receives a power source (Vcc) for controlling a plus electric potential via a pull-up resistor (R) as well as is connected to a reset terminal (RESET) of CPU, and during the closing of the micro-switch 111, said other end is L level and stops the operation of CPU and makes each of bass lines floating for a period of said duration.

A condenser (C) is charged for a certain time at supplying the power source or just after the micro-switch 111 has been shifted from closing to opening, and renders the resetting terminal (RESET) L level for said duration so as to stop the operation of CPU. When said charging is finished and the reset terminal is rendered H level, CPU is set at the initial set condition and operated thereafter.

A diode (D) discharges the condenser (C) during interruption of the power source, and is ready for a next supplying of the power source.

A further explanation will be made to operations of the above mentioned structure.

When the cassette 105 is separated from the machine body 101 and the cover plate 109 is closed, the micro-switch 111 is opened as shown in FIG. 8, and therefore the reset terminal (RESET) of CPU is H level ready for operation, and stitching patterns stored in ROM of the computer circuit 113 are produced by the stitch control data.

When the cover plate 109 is opened for attaching the cassette 105, it actuates the actuator 112 of the micro-switch 111 and closes the latter.

With respect to CPU, the reset terminal (RESET) is made L level and the bass lines are made floating so that the operation of the computer circuit 113 is stopped.

When the cassette body 105 is pushed in, it is electrically connected to the computer circuit 113 by means of the connectors 106 and 107 under the condition that the micro-switch 111 is closed. When the cover plate 109 is closed, the micro-switch 111 is opened. Thus, the attaching is completed. Since the micro-switch 111 is opened, CPU is set at the initial set condition and its operation is started. By the stitch control data stored in ROM of the computer circuit and the memory packed in the cassette body 105, the stitching patterns are produced.

When the cover plate 109 is opened for detaching the charged cassette body 105, the micro-switch 111 is operated to stop the work of the computer circuit 113. If the cassette 105 is pulled out from the housing part, the electric connection between the cassette body 105 and the computer circuit 109 is broken. By closing the cover plate 109, the micro-switch 111 is returned to its initial position and the computer circuit 113 is set at the initial stop condition to start the operation.

FIG. 9 shows yet another embodiment of the electric circuit. The actuating position between the cassette body 105 and a micro-switch 111a is the same as in FIG. 5, but the micro-switch 111a is closed reversely, and a connection with the computer circuit 9 is different. The closed micro-switch 111a is substituted for the micro-switch 111 of FIG. 8 for making and breaking the controlling power source (Vcc).

In FIG. 9, a circuit 114 of the power source is connected to a commercial power source 116 via a transformer 115. The micro-switch 111a is connected between the controlling power source (Vcc) and the computer circuit 113. When cover plate 109 is closed, the reset terminal (RESET) of CPU is H level and the computer circuit 113 is operative. When the micro-switch 111a is opened by opening the cover plate 109, the condenser (C) discharges via the diode (D), and the reset terminal (RESET) is made L level to stop the work of the computer circuit 113.

FIGS. 10 and 11 illustrate yet another embodiment showing an operation of the switch structure. The cassette housing part 104a is, at its side, pivoted with a lever 117 about a pin 118, which is biased clockwise by a spring 119. A cover plate 120 is provided to the lever 117. As shown with the solid line in FIG. 11, one end 120a of the cover plate is engaged with the cassette housing part 104a at its side, so that the cassette body 105 does not act for the opening of the cassette housing part 104a. Under this condition, an actuator 122 of a micro-switch 121 is pushed in by an end 117a of the lever 117, similarly to the above mentioned micro-switch 111 in FIG. 8. The micro-switch 121 is opened, and if the cover plate 120 is moved to the releasing side as shown with the dotted line in FIG. 11 for actuating the cassette 105, the actuator 122 is actuated to close the micro-switch 121. After the cassette body 105 is operated, the micro-switch 121 is manually opened.

As mentioned above, according to this invention, the structure is simplified. For operating the cassette, the computer circuit is made floating in response to this operation, and the connection is switched from attaching of the cassette body to the housing part to detaching thereof from the housing part, and vice versa, so that the no erroneous operation of the computer is made.

What is claimed is:

1. In a sewing machine having a housing, a combination of a computer circuit and a memory cassette, wherein said computer circuit includes at least a central processing unit and a first memory storing pattern data for different stitch patterns to be selectively produced, the computer circuit having a socket positioned in a housing guide groove (3) provided in said housing of the sewing machine, and the memory cassette has a cassette body, a second memory storing pattern data for a specific pattern, and a connector which is connected to said socket of the computer circuit by insertion of the memory cassette into said guide groove so as to read out the pattern data of the second memory to thereby produce a specific stitch pattern, said combination further comprising cam means formed immediately on said cassette body; switch means positioned at said guide groove and normally maintained in an inactivated condition and being activated by said cam means as the memory cassette is inserted into said guide groove; and circuit means connected to said switch means and including a reset circuit which is responsive to the activation of said switch means so as to make the computer circuit inoperative and also to the inactivation of said switch means so as to make said computer circuit operative; said cam means being formed so as to activate said switch means before the connector of said memory cassette is connected to the socket of said computer circuit and to restore said switch means to the inactivated condition after the connector has been connected to said socket, whereby said computer circuit is made inoperative by said circuit means before the memory cassette is connected to or disconnected from the computer circuit and the computer circuit is restored to operation after the memory cassette is connected to or disconnected from the computer circuit.

2. The sewing machine as defined in claim 1, wherein said switch means includes a microswitch having an actuator cooperating with said cam means of said memory cassette.

3. The sewing machine as defined in claim 2, wherein said reset circuit comprises substantially a combination of a capacitor, a resistor and a diode connected to a power source.

4. In a sewing machine having a housing, a combination of a computer circuit and a memory cassette wherein the computer circuit includes at least a central processing unit and a first memory storing pattern data for different stitch patterns to be selectively produced, the computer circuit having a socket positioned in a guide groove (3) provided in the housing of the sewing machine, and the memory cassette has a second memory storing pattern data for a specific pattern, a connector which is connected to the socket of the computer circuit by insertion of the memory cassette into said guide groove so as to read out the pattern data of the second memory to thereby produce the specific stitch pattern, said combination further comprising switch means normally maintained in an inactivated condition; circuit means connected to said switch means and including a reset circuit which is responsive to the inactivated condition of said switch means to maintain said computer circuit operative and to the activation of said switch means to make said computer circuit inoperative; and cover means including a cover element normally maintained to close said guide groove to maintain said switch means in an inactivated condition, said cover element being operated to open said guide groove before said memory cassette is inserted into said guide groove to connect said connector of said memory cassette to said socket of said computer circuit, and being operated to close said guide groove after said memory cassette is inserted into said guide groove; said switch means being activated in response to the operation of said cover element for opening said guide groove, and being restored to the inactivated condition in response to the operation of said cover element for closing said guide groove, whereby said computer circuit is made inoperative by said circuit means before the memory cassette is connected to or disconnected from the computer circuit and the computer circuit is restored to operation after the memory cassette is connected to or disconnected from the computer circuit.

5. The sewing machine as defined in claim 4, wherein said switch means includes a microswitch having an actuator cooperating with said cover element.

6. The sewing machine as defined in claim 5, wherein said reset circuit comprises substantially a combination of a capacitor, a resistor and a diode connected to a power source.

* * * * *